Aug. 8, 1961  J. W. EDGEMOND, JR., ET AL  2,995,160
BLADE TRACKING AND GUIDING MECHANISM FOR BAND SAW CONSTRUCTION
Original Filed Feb. 13, 1956  6 Sheets-Sheet 3
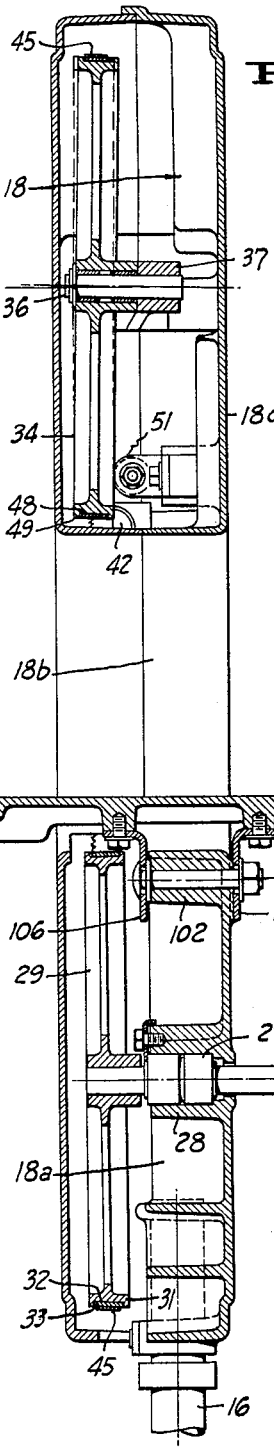
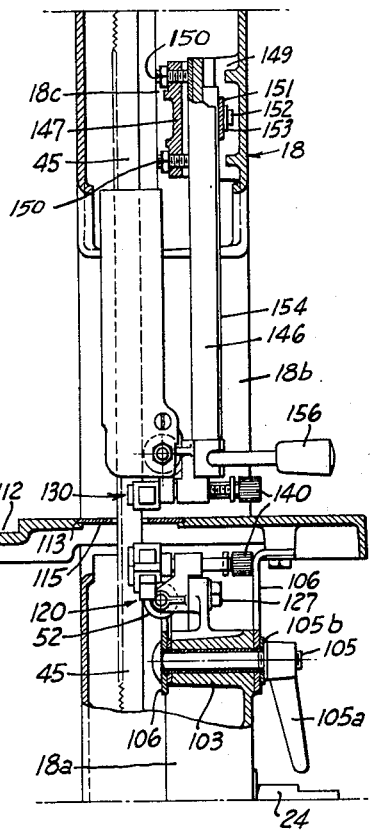
INVENTORS
John W. Edgemond, Jr.
William C. Grosjean
BY
ATTORNEYS Aug. 8, 1961 J. W. EDGEMOND, JR., ET AL 2,995,160
BLADE TRACKING AND GUIDING MECHANISM FOR BAND SAW CONSTRUCTION
Original Filed Feb. 13, 1956 6 Sheets-Sheet 4
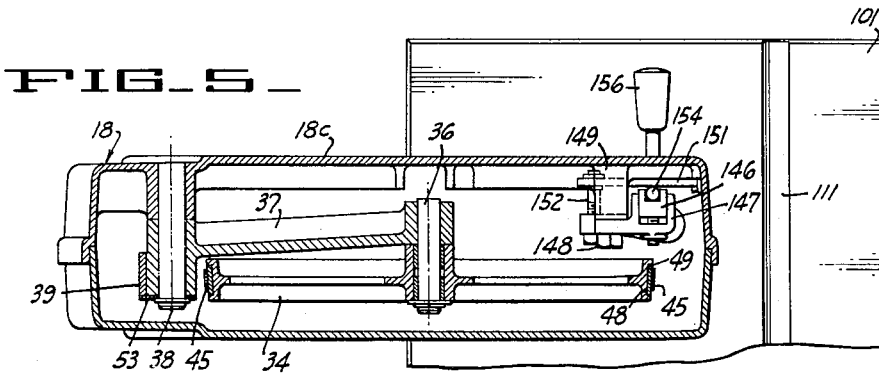
FIG_5_
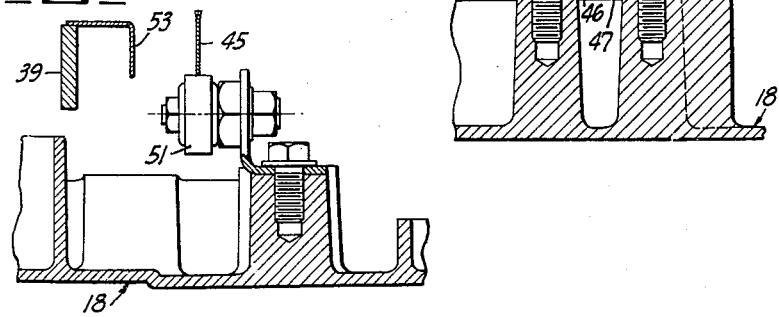
FIG_6_
FIG_7_
INVENTORS
John W. Edgemond, Jr.
BY William C. Grosjean
ATTORNEYS

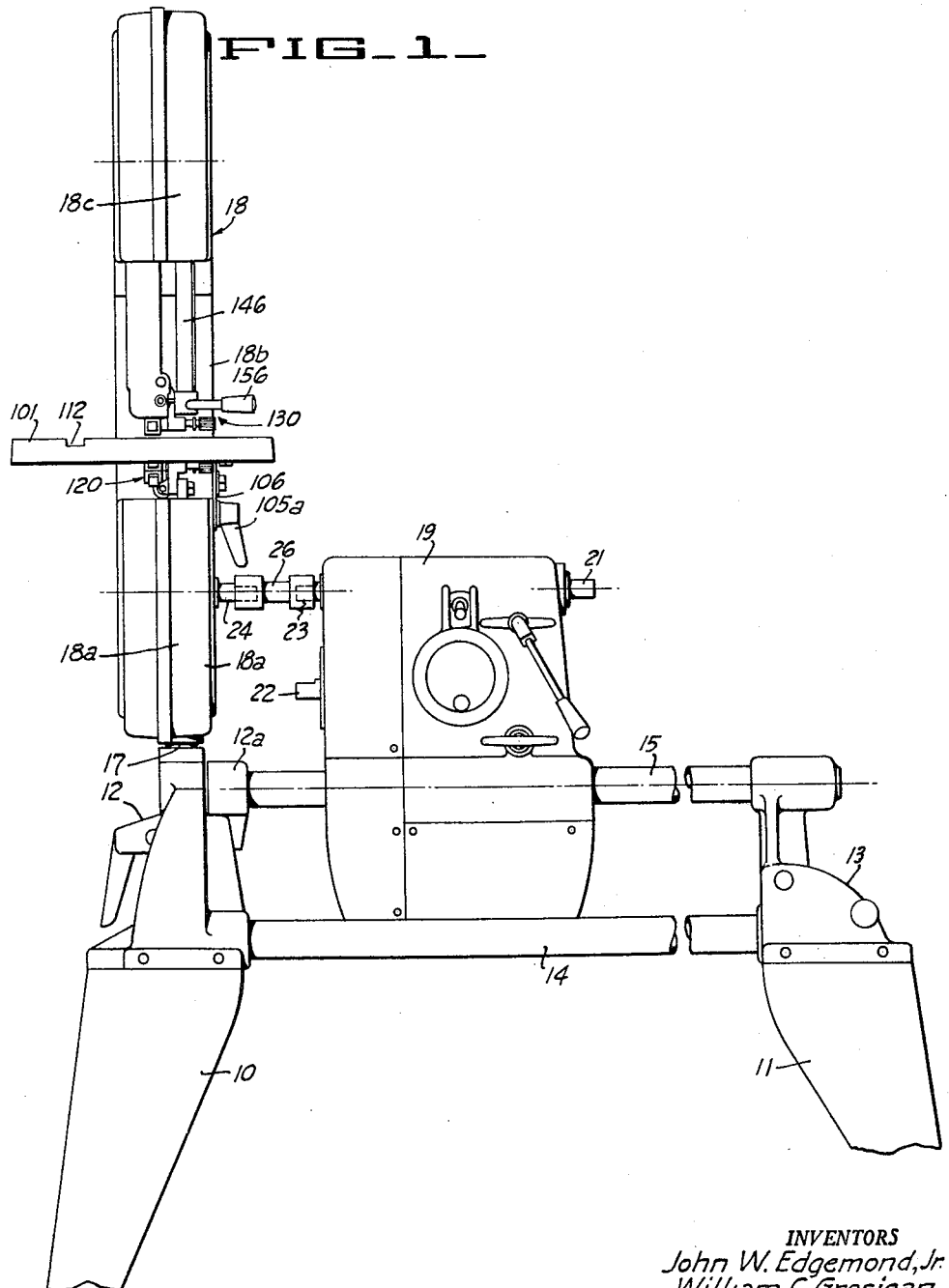

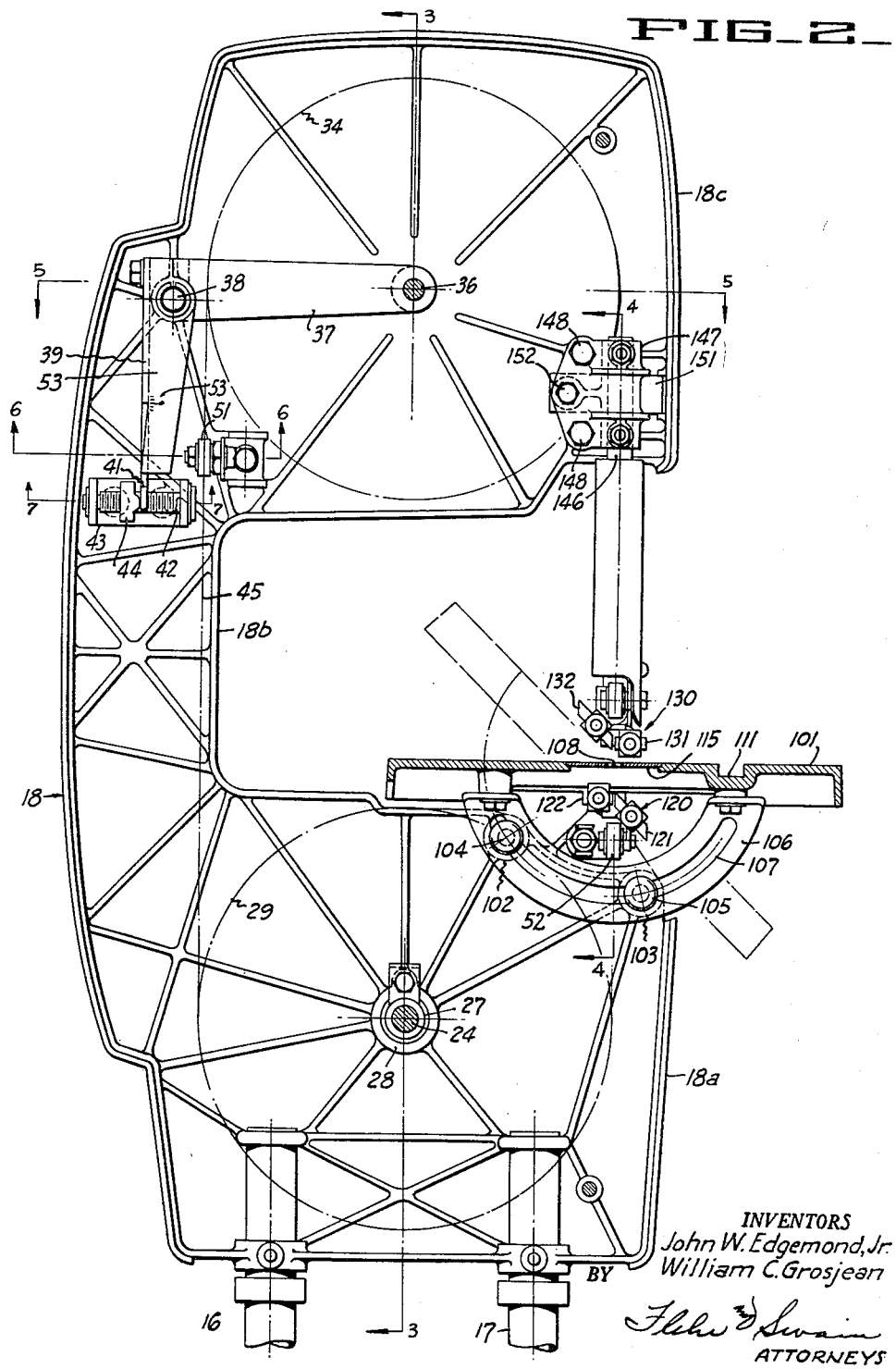

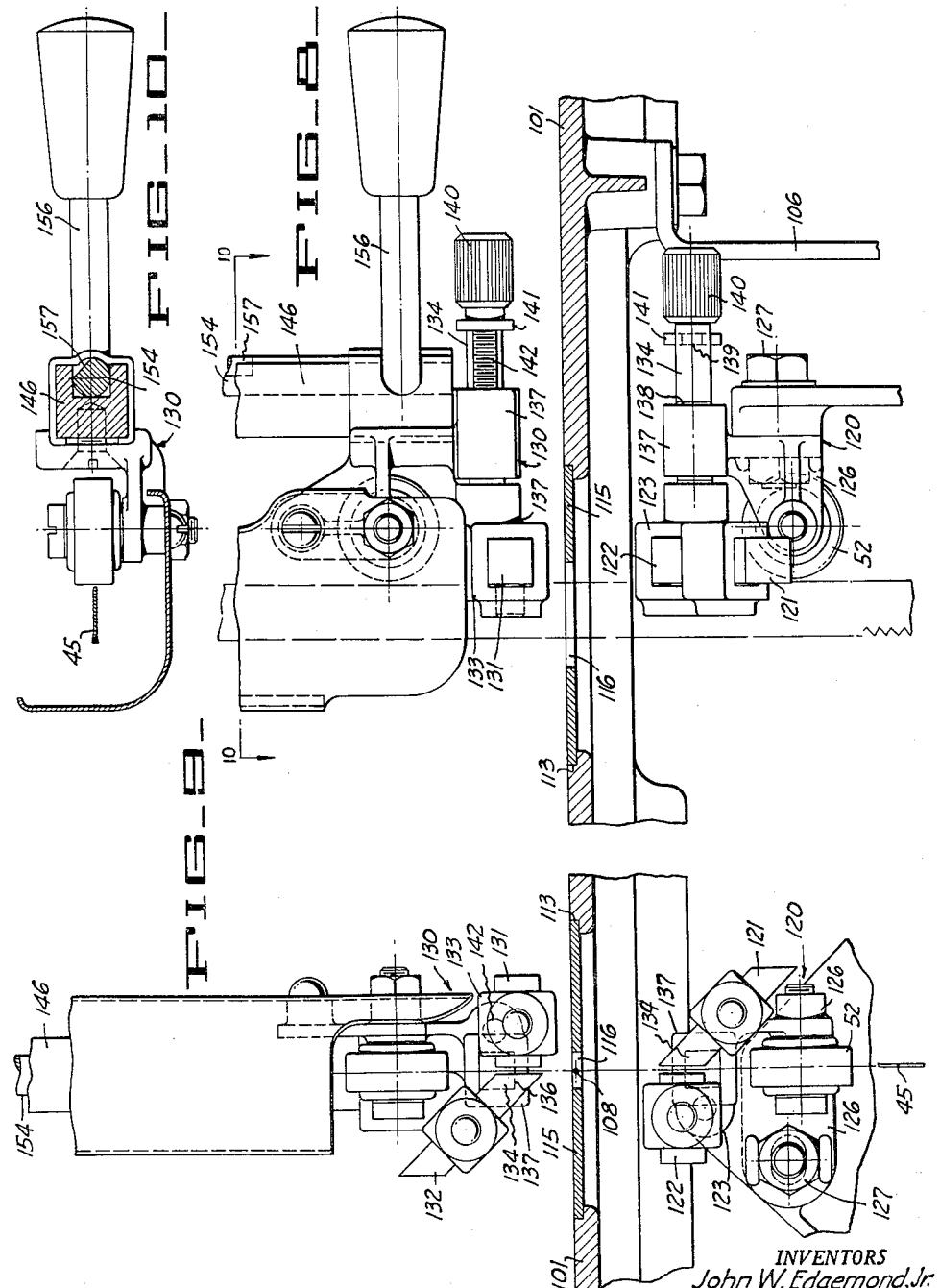

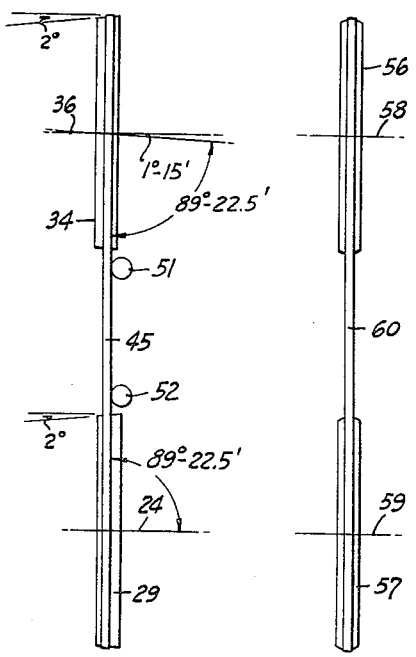
FIG_11_   FIG_13_
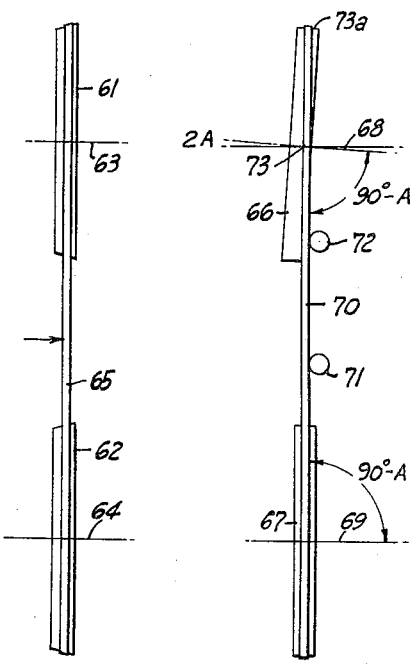
FIG_12_   FIG_14_
FIG_15_
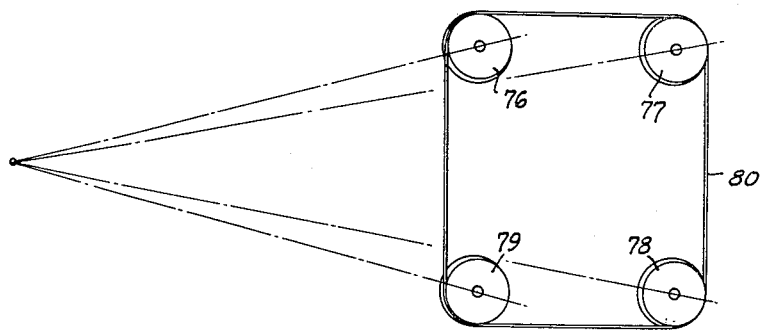
INVENTORS
John W. Edgemond, Jr.
William C. Grosjean
BY
ATTORNEYS United States Patent Office 2,995,160
Patented Aug. 8, 1961

2,995,160
BLADE TRACKING AND GUIDING MECHANISM FOR BAND SAW CONSTRUCTION
John W. Edgemond, Jr., Los Altos, and William C. Grosjean, Mountain View, Calif., assignors, by mesne assignments, to Yuba Consolidated Industries, Inc., San Francisco, Calif., a corporation of Delaware
Original application Feb. 13, 1956, Ser. No. 565,054, now Patent No. 2,903,027, dated Sept. 8, 1959. Divided and this application Jan. 28, 1959, Ser. No. 792,941
2 Claims. (Cl. 143—27)

This invention relates to band saws.

Band saws are well known and consist of an endless blade which passes over two or more pulleys which drive it past a working station. When the saw blade in a conventional band saw is tracking properly over the driving and idler pulleys, it does not engage the back-up rollers, but when a work piece is brought into engagement with the blade, the blade is urged into engagement with the back-up rollers. Thus, when the load against the blade is the heaviest, it is normally urged out of its ideal and most efficient path. Moreover, when the work is drawn away, the blade also tends to be drawn away from its most effective path, and, since there are no back-up rollers on the toothed side of the blade, it may not only be urged from the ideal operating path but may be removed from the guides because the forces tending to retain the blade in its path are at their minimum when the blade is properly adjusted to operate in its proper path at the crowns of the pulleys. The forces tending to retain or restore the blade to its path increase as the blade is urged from the crowns to one side or the other of the pulley or pulleys.

We have found that conventional band saws require and provide four adjustments and it is an object of our invention to provide a band saw construction in which the number of adjustments is reduced.

Conventional band saws required an adjustment or relocation of the back-up rollers when blades of different widths are used. For example, when the blade of a conventional band saw is properly adjusted it will ride the crowns of the pulleys, and the back-up rollers must be adjustable so they may be positioned immediately adjacent the blade to retain the blade in the path thus defined when a work piece is urged against it.

It is an object of this invention to provide a band saw construction in which the back-up rollers need not be adjusted as blades of different widths are used and in which a factory setting or other permanent setting may be retained regardless of blade width.

It is a further object of this invention to provide a band saw construction in which the back-up rollers define the path in which the blade operates and in which the blade is urged into and caused to operate in that path.

It is a further object of this invention to provide a band saw construction in which the back-up rollers define the path in which the blade is to operate and in which the blade is urged into that path by the construction and mounting of the pulleys.

Conventional band saws require a means for adjusting at least one of the pulleys to provide proper blade tension. This is normally accomplished by mounting the pulley in a block or blocks which are movable in guides whereby the pulley centers may be spaced further apart or nearer together.

It is an object of this invention to provide a band saw construction in which one of the pulleys is mounted upon a crank arm assembly which is pivotally mounted upon the frame to provide a simpler and more rugged frame construction.

Conventional band saws require means for tilting the axis of one of the pulleys to cause the blade to track on the crowns of the pulleys. While the blade might normally tend to seek the crowns, the axis of rotation of at least one pulley must be tiltable to ensure that the blade tracks on the crowns and in a path defined by the crowns of the pulleys.

When an operator changes the blade in a conventional band saw, he "backs off" on all adjustments. Then he first mounts the blade on the pulleys. He next adjusts the pulleys for proper tension for the blade. He may then turn the blade by hand and observe the path which the blade follows. By adjusting the tilt mechanism which varies the tilt of the upper pulley, he causes the blade to seek the crowns of the pulleys and its proper path. He next adjusts the back-up rollers and finally the guides are adjusted. Thus it is apparent that such a construction requires that all four adjustments be made or at least reexamined and reconsidered when a new blade is mounted upon the saw.

It is an object of this invention to provide a band saw construction in which the correct tilt of the axis of rotation or of the plane of rotation of the pulley is automatically obtained.

It is a further object of this invention to provide a device in which the pulley may be tilted without requiring readjustment or relocation of the back-up rollers.

It is a further object of this invention to provide a band saw construction in which only two of the normal adjustments, blade tensioning and guide shoe adjustment, are required with a change of blade and in which the back-up rollers need not be relocated and in which the pulley is automatically tilted when a blade is changed.

This application is a division of application Serial No. 565,054, filed February 13, 1956, now Patent No. 2,903,027.

Other objects and advantages of our invention will appear from the following specification taken in conjunction with the accompanying drawings in which:

FIGURE 1 is a front elevational view of a band saw incorporating our invention and showing the same mounted on one end of a "Combination Power Tool" of the type disclosed in Edgemond et al. application Serial No. 494,468, filed March 15, 1955, (now Patent 2,927,612, granted March 8, 1960);

FIGURE 2 is a cross sectional view of the band saw illustrated in FIGURE 1, showing the two pulleys over which the saw blade is operated and showing the means for raising and lowering the upper pulley and for tilting the table;

FIGURE 3 is a view taken through the line 3—3 of FIGURE 2 showing the mounting of the lower pulley and the table and the tilting of the upper pulley;

FIGURE 4 is a view taken along the line 4—4 of FIGURE 2 and shows a part of the table mounting mechanism and the guide shoe mechanism;

FIGURE 5 is a view taken along the line 5—5 of FIGURE 2 and shows the torsion arm mounting of the upper pulley and the single control mechanism which permits one hand operation of the upper guide;

FIGURE 6 is a view taken along the line 6—6 of FIGURE 2 and shows the upper back-up roller and its mounting;

FIGURE 7 is a view taken through the line 7—7 of FIGURE 2 and illustrates the apparatus for raising and lowering the upper pulley and for adjusting the blade tension;

FIGURE 8 is an enlarged detailed view of the guide shoe mechanism in fully retracted position, the means for adjusting the same and the lower back-up roller;

FIGURE 9 is a side view of the mechanism illustrated in FIGURE 8;

FIGURE 10 is a detail taken along the line 10—10 of FIGURE 8 showing the single lever control operating mechanism for raising and lowering the upper guide shoes and for locking the same in a predetermined selected position. The third guide roller which is immediately above the work and which is normally not engaged by the blade, except when a work piece is being cut, is also shown in this figure.

FIGURE 11 is a schematic view of our band saw showing the degree of tilt of the axis of the upper pulley and the conical shape of the pulleys;

FIGURE 12 is a schematic view of a conventional band saw utilizing crowned pulleys;

FIGURE 13 is a schematic view of another type of band saw showing the utilization of tapered or conical pulleys on parallel axes;

FIGURE 14 illustrates a modified type of band saw showing square pulleys mounted on non-parallel axes; and FIGURE 15 is a schematic view of tapered pulleys on a four pulley machine on non-parallel axes.

As indicated in the drawings, our device is adapted to be mounted upon one end of the Combination Power Tool disclosed in the Edgemond et al. Patent No. 2,927,612. While this tool illustrates a preferred embodiment and mounting, it must be understood that our device may be mounted for separate operation on a stand of its own and may be driven by an independent motor.

As is pointed out in the above identified Edgemond et al. patent, the combination power tool includes a pair of opposed identical tool bench ends 10 and 11 which support castings 12 and 13. The castings 12 and 13 accommodate parallel longitudinally extending tubes 14 and 15. Tubes 15 are supported at one end by casting 13 and at their other ends by casting 12a which may be clamped to casting 12 thereby providing a sturdy, rigid bench or supporting member.

The end casting 12 is provided with a pair of parallel spaced vertical sockets which are adapted to receive a pair of spaced parallel mounting tubes 16 and 17 whose other ends are received in similar recesses in a member 18 which forms a mounting base for our band saw.

The parallel tubular ways 15 provide a mounting for a headstock member indicated generally at 19 which supports an electric motor which is operatively connected to the power take-off shafts 21, 22 and 23, each of whose functions has been previously described in the aforementioned Edgemond et al. application. We provide a drive shaft 24 which is adapted to be coaxially aligned with the power take-off shaft 23 and to be operatively connected thereto by means of a readily removable coupling 26. It is apparent that our device can be mounted in any suitable base which is provided with spaced parallel cylindrically shaped sockets which are adapted to accommodate the mounting tubes 16 and 17 and which is further provided with a motor and means for operatively connecting the same to the driven shaft 24.

Generally speaking, our band saw is supported on the base member 18 which, as shown in the drawings, consists of a C-shaped casting which forms the framework for our entire structure. The lower arm 18a of the C-shaped casting 18 provides a mounting for the shaft 24 and the pulley which drives the saw blade. This portion of the base also provides a mounting for the table which supports the work piece. The narrow portion 18b of the member 18 serves to support the upper portion 18c and provides a throat area immediately above the table within which the work piece may be positioned, and the upper portion 18e provides a support for the idler pulley over which the saw band is driven, all as will more fully hereinafter be described.

The member 18 is preferably in the form of a die casting and appropriate strengthening ribs, bosses, etc. are molded integrally therewith.

The driven shaft 24 is rotatably mounted in a bearing 27 which in turn is mounted in an appropriately positioned and machined boss 28 cast integrally with the base 18. The shaft 24 supports a driving pulley 29 whose rim 31 is grooved at 32 to accommodate an annular tire 33 which may be formed of rubber, either natural or synthetic, or some other resilient material which will not dull the saw teeth and which will not be seriously cut by the saw teeth. The shaft 24 is coaxial with the driving shaft 23, and the plane of rotation of the pulley 29 is vertical. The upper pulley 34 is rotatably mounted upon an axle 36 which is supported upon a torsion arm 37 which is pivotally mounted upon a shaft 38. Torsion arm 37 is provided with a leaf spring 39 which extends downwardly, as indicated in FIGURE 2. The lower end of the spring 39 is formed, as shown in FIGURE 8, with a recessed portion 41 which is adapted to partially surround a bolt 42. The bolt 42 is provided with non-threaded portions 42a and 42b and is rotatably mounted in a U-shaped member 43 which is secured to bosses formed on the base 18. Intermediate the parallel arms or ends 43a and 43b of the U-shaped member 43 and threadedly mounted upon the bolt 42 is a nut 44 which is provided with a flat surface 46 which engages a similar surface 47 on the base of the U-shaped member 43. As the bolt 42 is turned, the member 44 will be urged in one direction or another, depending upon the direction of rotation of the member 42. The weight of the pulley 34, axle 36, torsion arm 37, and the resistance of the saw blade 45 will tend to urge the pulley 34 downwardly and the lower end of the spring 39 to the left, as viewed in FIGURE 2, against the member 44. When the member 44 is urged to the right, as viewed in FIGURE 2, the pulley 34 will be raised upwardly about the axis of the shaft 38. The pulley 34 is provided with a groove 48 and tire 49 which are substantially identical to the groove 32 and tire 33 on pulley 29.

A pair of rollers 51 and 52 are suitably mounted immediately adjacent the entering sides of the pulleys 29 and 34. It must be borne in mind that the pulleys 29 and 34 are rotating in a clockwise direction when viewed in FIGURE 2, and therefore the roller 51 is mounted in such a manner that the blade 45 engages it just before it engages the pulley 34. The roller 52 is mounted in such a manner that the blade 45 engages it just before it engages the pulley 29. Both the rollers 51 and 52 are permanently positioned with respect to the frame 18 to engage the back or non-toothed edge of the blade 45 to define the predetermined path of the blade 45 and to resist or overcome the tendency of the blade to move to the right, as viewed in FIGURE 3.

As has been previously pointed out, the drive shaft 24 is horizontal. The axis of the axle 36 is set at an angle of one degree and fifteen minutes to the horizontal however, as shown in the schematic sketch, FIGURE 11. The pulleys 29 and 34 are conical in that a plane tangent to the periphery would be an angle of approximately two degrees to the axis of rotation, as likewise shown in FIGURE 11.

Therefore, the angle of the blade 45 with respect to the axis of rotation of the pulley 29 is 90° less 37½ minutes. The angle of the blade with respect to the axis of the axle 36 is likewise 90° less 37½ minutes, all as illustrated in FIGURE 15. It will be apparent that the axes of the axle 36 and the shaft 24 could be offset 37½ minutes with respect to the horizontal, and the blade could be driven in a vertical plane, but since the driveshaft 24 must be horizontal, it is necessary, in effect, to tilt the whole device so that the blade does not operate in a vertical plane but operates in a plane which is 37½ minutes off the vertical.

A suitable scale 53 is secured to the torsion arm 37 and rotates about the shaft 38 generally as shown in FIGURE 2 in such a manner that one edge of the spring 39 is adapted to be aligned with a specific indicium upon the scale. The indicia on the scale 53 reflect different widths of saw blades 45 and show the recommended factory setting for the adjustable pulley 34 for blades of different widths. Blades of different widths operate at different tensions; the greater the width of the blade the greater the tension while the narrower the blade, the less the tension. Thus when a new blade is mounted on our device the whole assembly consisting of the pulley 34, arm 37 and scale 53 are rotated about the member 38 until all of the slack is taken out of the blade. Then by further movement of the member 44, the spring 39 is bent or put under tension until its edge lines up with the appropriate indicium on the scale 53. However when tension upon spring 39 is increased to increase the blade tension for a heavier or thicker blade, the pressure of the blade 45 against the back-up roller 51 is increased. To compensate for this increased pressure against the back-up roller 51, the torsion member 37 twists (due to increased blade tension) and thus automatically relocates the tilt axis of the shaft 36 and pulley 34. This reduces the conical effect of the pulley 34 and the lead-in effect which the tilted conical pulley 34 normally has on the blade 45 and, further, reduces the angle of the back edge of the blade 45 to the axis of pulley 34 thereby decreasing the pressure of the blade 45 on the back-up roller 51. When a lighter blade is used the pressure upon the spring 39 is decreased, the tension on the blade 45 will be lessened and the pressure on the back-up roller 51 will be decreased. The tension of a narrower or lighter blade will twist the member 37 to a lesser extent, will result in a lesser reduction of the conical effect of the pulley 34 and a lesser reduction of the lead-in effect of the blade 45, and will increase the angle of the back edge of the blade 45 to the axis of pulley 34.

While we have shown a torsion arm 37 we contemplate that the same result would occur if the pulley 34 was supported by a rigid member having a torsion mounting.

Operation of our tensioning means and our automatic tilting and tracking mechanism may briefly be described as follows:

Let it be assumed that the device is in the condition illustrated in the drawings. A blade 45 of selected width is positioned about the pulleys 29 and 34. The width of the blade is noted and the arm 39 is positioned with respect to the scale 53 so that it is aligned with the indicium which corresponds to the width of the blade. The back-up rollers 51 and 52 are inspected to determine that they define a plane or path of operation of the blade 45 which has been designed to be at an angle of 37½ minutes off the vertical.

The cover may be replaced so that the pulleys 29 and 34 and the greater length of the blade 45 is shrouded.

The shaft 24 is connected through a coupling 26 to the driving shaft 23. The motor may be started.

The blade 45 will be driven past the work station and because of the tilt of the pulley 34 and the generally conical shape of the pulleys 29 and 34, the blade 45 will seek the crown or greatest diameter of the pulleys 29 and 34 and will be urged to the right as viewed in FIGURES 3 and 11 into engagement with the back-up rollers 51 and 52. These rollers are positioned at points where they engage the blade immediately before it engages the associated pulley. Thus, the back-up rollers define the path of the blade. The mounting of the pulleys and their conical shape keeps the blade in that path.

As has been previously mentioned, when a wider blade is used, greater tension is required and the tension of the blade is adjusted by increasing the tension of spring 39. The greater tension of a wider blade would increase the blade pressure against the back-up roller 51 and to prevent excessive pressure and resultant excessive wear we have mounted the pulley 34 upon a torsion member 37. Thus the increased tension of a wider blade twists the member 37 about its longitudinal axis and changes the tilt of the axle 36 and of the plane of the pulley 34. This results in a lessening of the lead-in effect which the conical pulley 34 normally has on the blade 45 and decreases the pressure of the blade upon the back-up roller 51.

When a blade is operated over a pair of crowned pulleys 56 and 57 rotating in the same plane and about parallel axes 58 and 59, the saw blade will seek the crowns, will tend to follow the path indicated at 60 (see FIGURE 12), and will seek a path in the plane of the greatest circumferences of the pulleys 56 and 57.

We have found that when conically shaped pulleys of the type illustrated in FIGURE 13 at 61 and 62 are rotated about the axes of parallel shafts 63 and 64, the blade 65 will seek the plane of the greatest circumference of each of said pulleys 61 and 62 and will, unless prevented by annular flanges on the pulleys 61 and 62 or by rollers of the type 51 and 52 on our device, continue to move to the right, as viewed in FIGURE 13, and will ultimately become entirely disengaged from the pulleys 61 and 62.

We have also found that when pulleys 66 and 67, as shown in FIGURE 14, are mounted for rotation about offset axes 68 and 69, the same phenomenon will occur. Let it be assumed that the axes 68 and 69 are offset one degree and fifteen minutes, as has previously been described in connection with our preferred embodiment. Let it also be assumed that the rims of the pulleys 66 and 67 are not crowned or tapered. We have found that the blade 70 travels in a plane at an angle with respect to each axis and that rollers 71 and 72 are required. It would ordinarily be assumed that the blade 70 would travel upwardly or to the left, as viewed in FIGURE 18, but it must be borne in mind that the blade 70 engages pulley 66 at a point 73 and the tracking or frictional engagement of the blade with the pulley 66 keeps the blade from climbing to the left, and, in fact, urges it to the right, necessitating the utilization of rollers 71 and 72. In other words, the point 73 at which the blade 70 engages the pulleys 66, will, as the pulley 66 rotates, approach the point 73a and, in this manner, the saw blade will be continually urged to the right, as viewed in FIGURE 14.

We have also noted a phenomenon, as illustrated in FIGURE 15, in which a plurality (more than two) of tapered pulleys (of the type shown in FIGURES 12 and 14), 76, 77, 78 and 79 rotate about offset axes. The blade 80 will tend to operate in the plane defined by the greatest effective circumference of the combined pulleys 76, 77, 78 and 79, previously described, and back-up rollers would be required to engage the non-toothed or smooth surface of the blade 80 to maintain the same upon the pulleys 76 to 79 inclusive.

The table which is adapted to support the work piece consists generally of a flat member 101 which is tiltably supported as viewed in FIGURE 2. The base 18 is provided with a pair of bosses 102 and 103 (FIGURES 3 and 4) each of which accommodates a bolt 104 and 105. A pair of identical arcuately shaped members 106 are secured to the bottom side of the table 101. The members 106 are provided with arcuate slots 107 through which the bolts 104 and 105 pass, as viewed in FIGURES 3 and 4, and the bolts 104 and 105 define the path of the arcuate slots 107. The arcuate members 106 and their arcuate slots 107 are so designed that their centers coincide at 108 (which defines a line across the middle of the table 101) so that the table 101 pivots about the line 108. The line 108 also determines the center line through which the blade 45 passes so that the table 101 may also be said to pivot about the center line of the blade 45.

Substantially continuous tension is maintained upon the members 106 by the nut and bolt assembly 104, but a locking action is obtained through the handle 105a on the bolt 105. When the handle 105a is tightened, the head of the bolt 105 and the washer 105b frictionally engage the members 106 and urge the same into greater frictional engagement with the boss 103 on the frame 18, thereby preventing the movement of the members 106, When the handle 105a is released, the members 106 may be swung about the center line 108 with the result that the table 101 may also be tilted about the axis defined by the center line 108.

We claim:

1. In a band saw construction, a frame, a lower pulley rotatably mounted on said frame, an upper pulley, a saw blade carried by said pulleys, a generally horizontally disposed arm pivotally mounted on said frame adjacent one end of said arm, means for rotatably mounting said upper pulley on that end of said horizontally disposed arm remote from its pivotal connection to the frame, a generally downwardly disposed scale plate mounted on said arm adjacent its pivotal connection to the frame, indicium on said scale plate, a leaf spring secured to said arm adjacent its pivotal connection to the frame adapted to flex in a plane parallel to the plane of said scale plate and normal to the axis of said pivotal connection and to cooperate with said indicium to form a gauge, means for adjusting the tension on said saw blade comprising adjusting means on said frame engaging said leaf spring at a point adjacent its free end to move the same about the pivotal connection to alter the position of said arm and upper pulley with respect to said lower pulley and of said leaf spring with respect to the indicium on said scale plate.

2. In a band saw construction, a frame, a lower pulley rotatably mounted on said frame, an upper pulley, a saw blade carried by said pulleys, a generally horizontally disposed arm pivotally mounted on said frame adjacent one end of said arm, means for rotatably mounting said upper pulley on that end of said horizontally disposed arm remote from its pivotal connection to the frame, the axes of rotation of said pulleys and the axis of said pivotal connection being parallel, a generally downwardly disposed scale plate mounted on said arm adjacent its pivotal connection to the frame, indicium on said scale plate, a leaf spring secured to said arm adjacent its pivotal connection to the frame adapted to flex in a plane parallel to the plane of said scale plate and normal to the axis of said pivotal connection and to cooperate with said indicium to form a gauge, means for adjusting the tension on said saw blade comprising adjusting means on said frame engaging said leaf spring at a point adjacent its free end to move the same about the pivotal connection to alter the position of said arm and upper pulley with respect to said lower pulley and of said leaf spring with respect to the indicium on said scale plate.

References Cited in the file of this patent

UNITED STATES PATENTS

| | | |
|---|---|---|
| 801,815 | Seymour | Oct. 10, 1905 |
| 1,323,818 | Berry | Dec. 2, 1919 |
| 1,879,145 | Erickson | Sept. 27, 1932 |
| 2,311,762 | Kottmann et al. | Feb. 23, 1943 |
| 2,806,490 | Kennedy | Sept. 17, 1957 |
| 2,903,027 | Edgemond et al. | Sept. 8, 1959 |